F. L. HARMON.

EYELETING MACHINE.

APPLICATION FILED OCT. 11, 1919.

Reissued Aug. 17, 1920.

14,931.

4 SHEETS—SHEET 1.

WITNESSES:

Adrian D. Mac

M. Mae. Durall

INVENTOR

Frank L. Harmon

BY

Henry J. Miller

ATTORNEY

F. L. HARMON.

EYELETING MACHINE.

APPLICATION FILED OCT. 11, 1919.

Reissued Aug. 17, 1920.

14,931.

4 SHEETS—SHEET 2.

WITNESSES:

Adrian DeMau

W. Max. Durall

INVENTOR

Frank L. Harmon

BY Henry J. Miller

ATTORNEY

F. L. HARMON.

EYELETING MACHINE.

APPLICATION FILED OCT. 11, 1919.

Reissued Aug. 17, 1920.

14,931.

4 SHEETS—SHEET 3.

WITNESSES:

Adrian Dotthan.

W. Marl. Duvall

INVENTOR

Frank L. Harmon

BY Henry J. Miller

ATTORNEY

F. L. HARMON.

EYELETING MACHINE.

APPLICATION FILED OCT. 11, 1919.

Reissued Aug. 17, 1920. 14,931.

4 SHEETS—SHEET 4.

WITNESSES:

Adrian DeWaal.

W. Marc. Duvall

INVENTOR

Frank L. Harmon

BY Henry J. Miller

ATTORNEY

UNITED STATES PATENT OFFICE.

FRANK L. HARMON, OF BEVERLY, MASSACHUSETTS, ASSIGNOR TO SINGER MANUFACTURING COMPANY, OF ELIZABETH, NEW JERSEY, A CORPORATION OF NEW JERSEY.

EYELETING-MACHINE.

14,931. Specification of Reissued Letters Patent. Reissued Aug. 17, 1920.

Original No. 1,262,336, dated April 9, 1918, Serial No. 875,371, filed December 3, 1914. Application for reissue filed October 11, 1919. Serial No. 330,137.

*To all whom it may concern:*

Be it known that I, FRANK L. HARMON, a citizen of the United States, and resident of Beverly, county of Essex, Commonwealth of Massachusetts, have invented an Improvement in Eyeleting-Machines, of which the following description, in connection with the accompanying drawings, is a specification, like characters on the drawings representing like parts in each of the several views.

This invention relates to eyeleting machines for punching holes in material such as the uppers of boots and shoes and setting eyelets in the punched holes by an automatic sequence of operations. One prime object of the invention is to provide an eyeleting machine wherein the operation of feeding the material to space the eyelets may be carried on at the same time that the setting mechanism is acting to clench the eyelets in the material, thereby greatly expediting the sequence of operations and increasing the capacity of the machine. A further important object is to provide means whereby the eyelet is taken out of the race-way and inserted into the hole by the punch that punches the hole without requiring any movement of the race-way itself; preferably in the carrying out of this feature of the invention the eyelet is alined and brought into the hole when the hole is punched and is not thereafter removed or displaced until it is pressed forward for clenching. The invention in its preferred form is embodied in a telescopically combined punch and set mechanism, the punch being positively held projected and moved laterally and forward to take an eyelet from a race-way that may be stationary and punch a hole in the material, at the same time positioning the eyelet so that it may be pressed inward by the set and clenched. According to the preferred embodiment of the invention the telescopic punch and set are then moved laterally and the set at the same time pressed forward, while the punch is permitted to recede, for pressing down and clenching the eyelets. A still further feature of the invention has to do with an improved operating mechanism for effecting the lateral or spacing movement of the punch and set mechanism, this consisting in a cam member with a coöperative element adapted to be adjusted relative thereto so as to give predetermined variable strokes to the operated parts, according as different operative paths of the cam are traversed, *i. e.*, the punch and set in their lateral movement, this cam being so formed that as the strokes of the operated parts are thus varied, they will always return to the same initial position regardless of the length of the stroke. This variable feed cam member is preferably associated with other cam mechanism connected to operate in synchronism therewith, the latter cam mechanism being timed to wait for the motions imparted by the first named cam member in producing the sequence of operations, *i. e.*, punching and setting movements for eyeleting a material. Further I believe that I am the first to provide a machine for operating on material and feeding the same, comprising means for producing a manufacturing result on material or articles or both, with a cam connected for actuation in timed relation therewith, said cam being formed to present a series of operating paths of varying contour and having means adjustable relatively thereto to engage a selective one of said operating paths, in combination with means for engaging a material to feed the same having a connection with said cam engaging means, said operating paths of said cam being formed to feed the material with varying strokes according to the adjustment of said cam engaging means. A further feature of the invention consists in improved means for mounting an anvil which may bear a punch block and clenching surface in coöperative relation with the operating tools with a capability of pliable self adaptation to said tools, this being a feature of special value in a duplex machine and preferably attained by having the anvil member carried by a relatively soft pliable strip such as of soft copper. A further feature relates to anti-friction edge guiding means for the material as it is fed along. In accordance with a further feature of the invention, the anvil backing against which the punch and set operate, is moved laterally with the punch and set as the feeding or spacing movement of the material is effected. A still further feature has to do with an improved arrangement and aggroupment of plural punching and setting mechanisms connected for operation by a common actuating mechanism constituting a duplex or a multiple eyeleter. The foregoing and other objects and features of the invention will be better understood from the following detailed description taken in connection with the accompanying drawings and will be thereafter pointed out in the appended claims.

Referring to the drawings.

Figure 5:
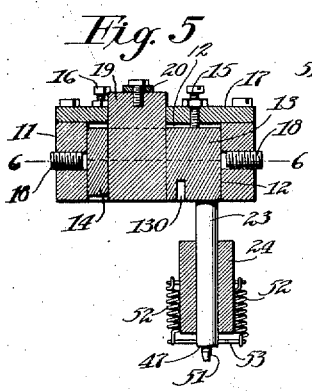

Fig. 5[a] is a sectional view similar to Fig. 5, showing the parts in different positions.

Figure 1:
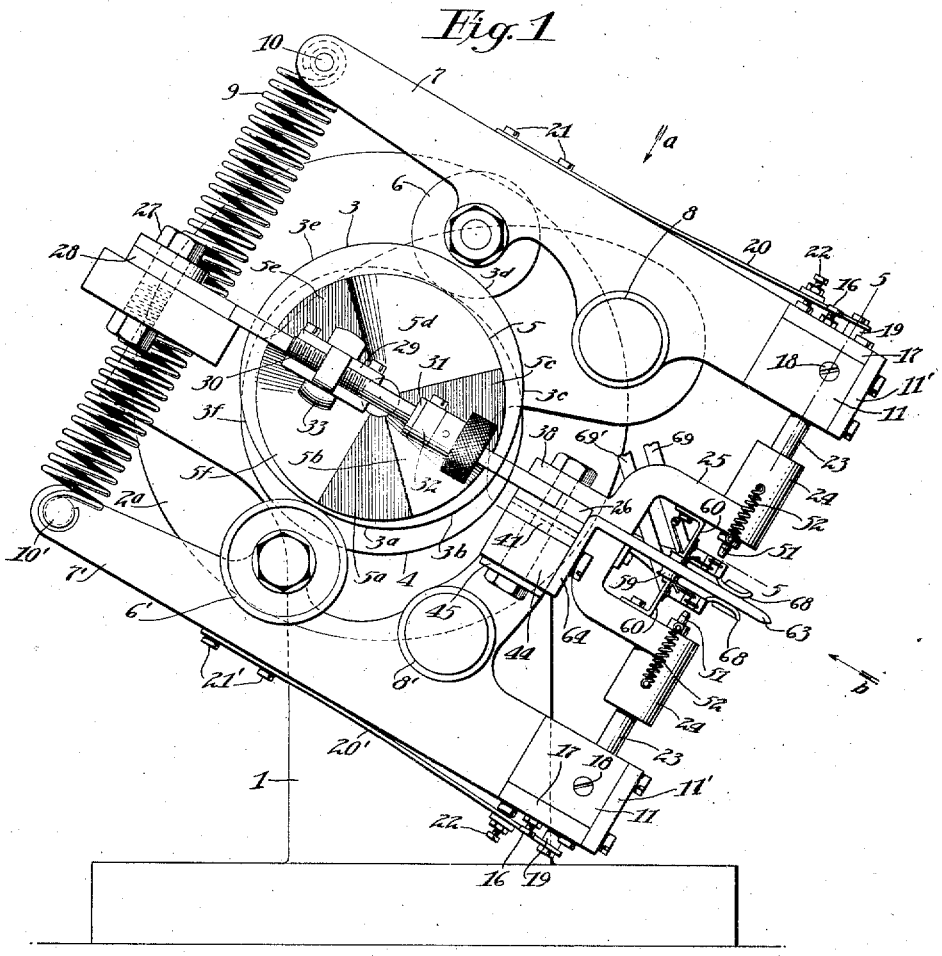
Figure 1 shows in side elevation a machine constructed in accordance with my invention.
Figure 5A:
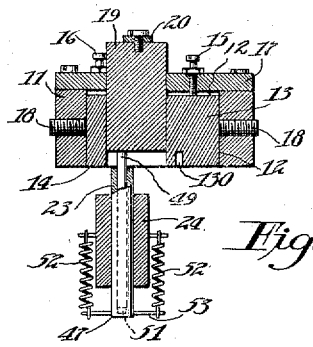
Fig. 5 is a sectional view of one of the operating heads taken on line 5—5 of Fig. 1.
Figure 2:
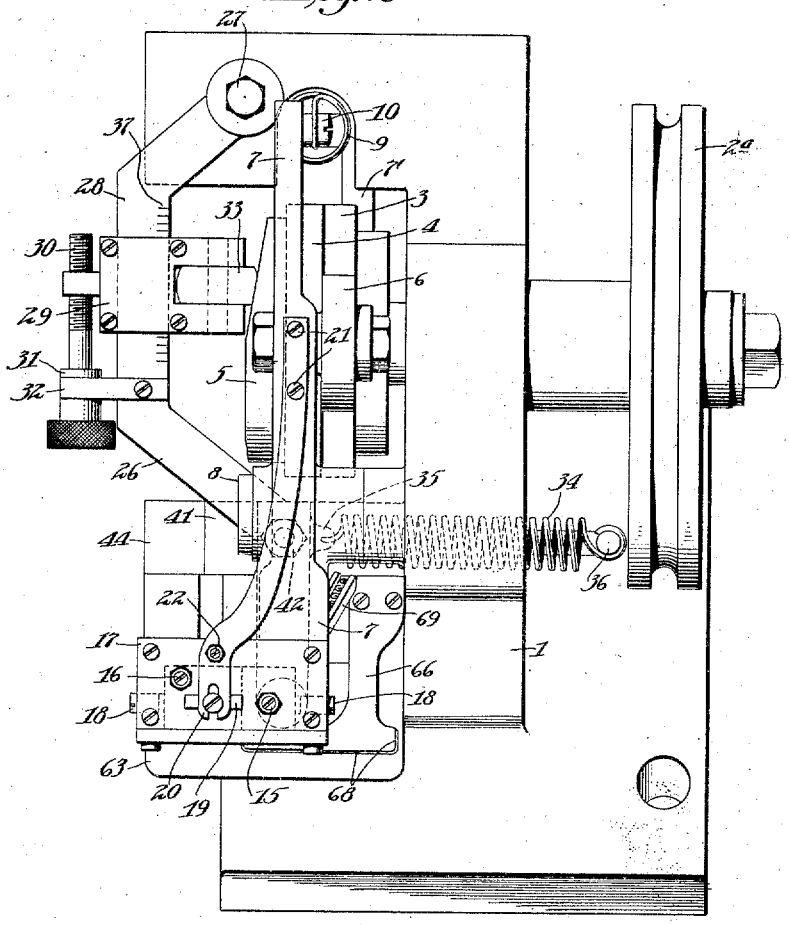
Fig. 2 is a plan view thereof looking in the direction of the arrow *a* in Fig. 1.
Figure 3:
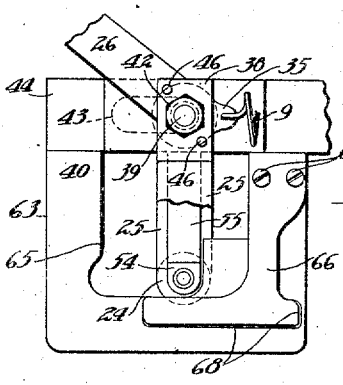
Fig. 3 is a fragmentary elevation with parts broken away showing certain of the immediate operating parts, and the material support.
Figure 4:
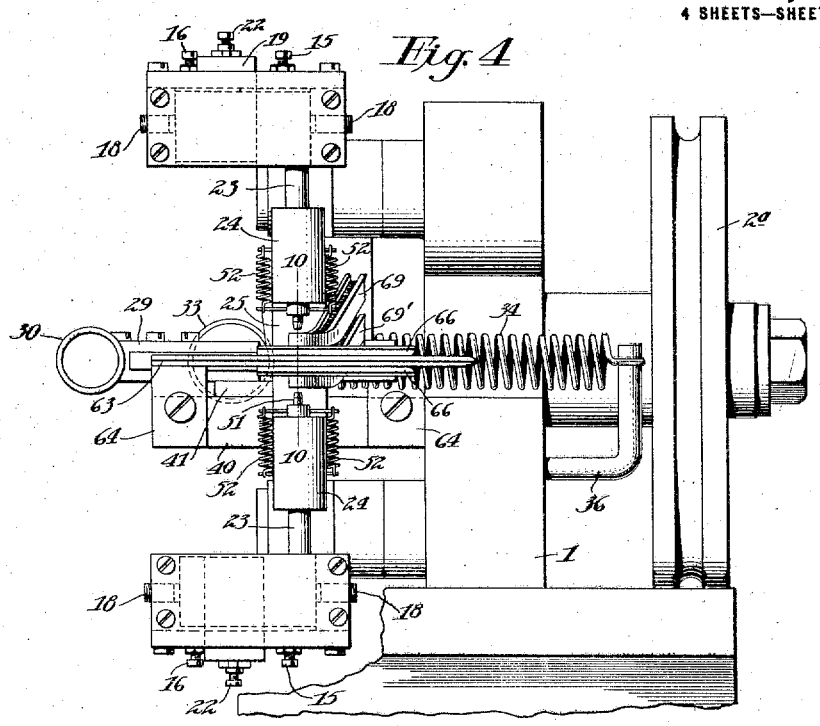
Fig. 4 is a front view looking in the direction of the arrow *b* in Fig. 1.
Figure 7:
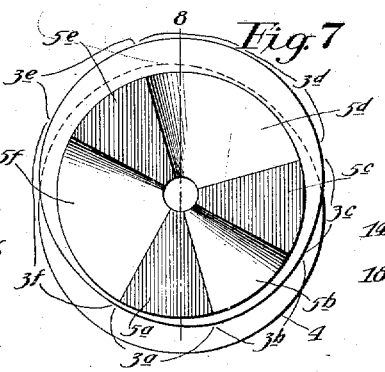
Figure 6:
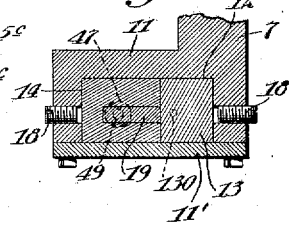
Figure 8:
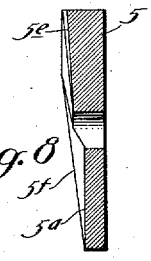
Figure 9:
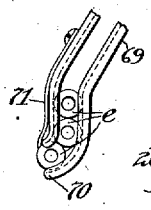
Figure 10:
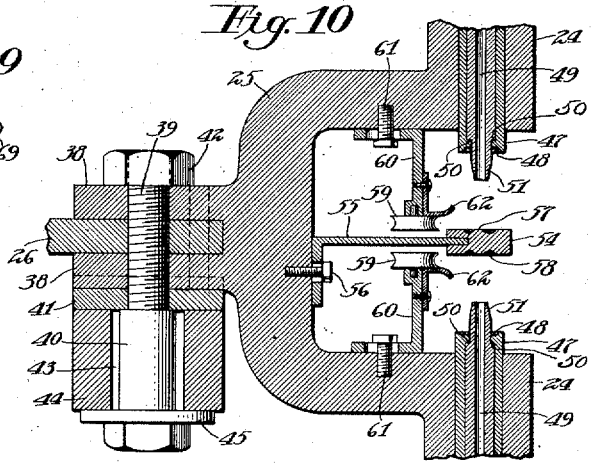
Figure 13:
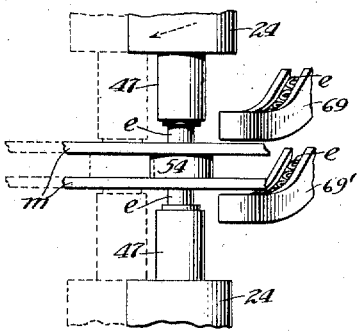
Figure 12:
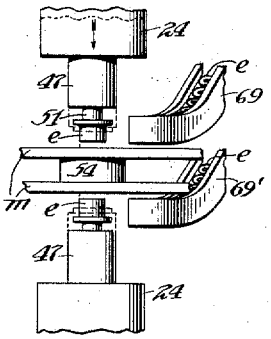

Fig. 6 is a transverse section on line 6—6 of Fig. 5;

Fig 7 shows in elevation the face cam for imparting the spacing movements;

Fig. 8 is a section of said cam on line 8—8 of Fig. 7;

Fig. 9 is a fragmentary detail showing in plan the delivery end of a race-way;

Fig. 10 is a partial sectional view on line 10—10 of Fig. 4; and

Figs. 11, 12, 13, 14 are similar fragmentary elevations of the working parts *i. e.*, the punch and set mechanisms, the anvil, and the eyelet raceways, showing the moving elements in their successive operative positions.

The working mechanism of the machine is shown as mounted on a suitable base and frame support 1 which may be of a pedestal type. In the top portion of this support a shaft 2 is journaled, shown as equipped with a driving pulley 2[a] and constituting the driving means for the machine. On this shaft are fixed two oppositely disposed peripheral cams 3, 4 arranged side by side and a face cam 5, the particular contour and manner of operation of these cams being specifically explained hereinafter. The peripheral cams 3, 4 have engageable therewith rollers 6, 6′, respectively, journaled on levers 7, 7′, these levers being oppositely disposed and fulcrumed to the frame work at 8, 8′, with an arrangement such that when they are in working position with their rollers held against the respective cams they are obliquely disposed and in general parallelism. Means for holding the rollers 6, 6′, against their respective cams is shown as a stout coil spring 9 engaged at its respective ends to the outer ends of the levers at 10, 10′ and tending to draw these ends together. The inner ends of the levers 7, 7′ extend opposite the operating tools, *i. e.*, the punch and set mechanisms and their extremities are formed with lateral offset heads 11. Each of these heads or hammers is bifurcated, and a cover plate 11′ bridges the opposed spaced forks or arms to form a vertical rectangular recess 12, which is in the direction of operating movement of the hammer, to receive blocks 13, 14, which are slidably fitted therein and constitute backing pieces to engage the punch and set mechanism. The block 13 may be adjusted endwise in said recess by an adjusting screw 15 and the block 14 is likewise adjustable by a screw 16 both these screws being threaded in a plate 17 fixed to the head, and these blocks may be rigidly and securely clamped against all looseness and movement by other set screws 18 shown as threaded in laterally through the head 11 at opposite sides thereof. Slidably fitted in the block 14 is another relatively thin block member 19 extending out from the back of the head where it is engaged by a leaf or plate spring 20 fixed to the back of the lever at 21. This member 19 is of a thickness equal to, or greater than the diameter of the rear end of the punch 49, but less than the external diameter of the rear end of set 47 to be later described further. As seen in Figs. 5 and 6 it is of substantial width, extending in alinement with the lateral travel of the punch as later explained and affording a yielding backing for the punch in a part of its travel. The spring 20 has fitted therein an adjusting screw 22 adapted to abut against the back of the lever and determine the extent to which the block 19 is normally projected forward thereby, *i. e.*, so that the front face of said block will be substantially flush with the face of the block 13. The telescopically combined punch and set mechanisms which constitute the operating tools of the present invention and indicated generally at 23 are carried in sleeve heads 24 in spaced apart relation and oppositely extending, by a yoke frame 25. The yoke frame 25 is borne at the outer end of a lever 26 fulcrumed to the fixed frame support at a point some little distance back of the shaft 2 as seen at 27. An intermediate portion of this lever is bowed out and formed with a straight part 28 extending at right angles to the shaft 2 and hence parallel with the base of the face cam 5. Along this straight part a block 29 is fitted for sliding adjustment by the action of a manually operable adjusting screw 30 journaled and held as seen at 31 in a lug 32 projecting from the lever. The block 29 affords journal bearings for a roll 33 adapted to engage the operative face of the cam 5 against which it is held by a stout coil spring 34 having its respective ends fixed to a forward portion of the lever as seen at 35 and to the fixed frame work at 36. The roll 33 is adapted to engage different operative circuits of the face cam 5 at different distances from the center thereof and for the purpose of determining its adjustment for these several operative circuits, the straight part 28 of the lever is suitably graduated as seen at 37. The yoke frame 25 is formed separate from, though rigidly attached to the lever 26. For securing the yoke frame to the lever it is provided with spaced apart extending lugs 38 adapted to receive between them the extremity of the lever 26 which is bent in from its intermediate bowed out portion. A stout bolt 39 is threaded through these ears and the intermediate lever end, this bolt having a smooth enlarged lower extension 40 forming a shoulder adapted to clamp a wear plate 41 against the lower lug 38 by coaction with a nut 42 threaded on the upper end of the bolt. The lower smooth extension 40 of said bolt operates in a slot 43 of a fixed frame support portion 44 and at its bottom the head of the bolt is equipped with a flange or washer 45 adapted to have bearing against the bottom of the frame portion 44. Thus as said bolt is fitted to place and held by its nut, the wear plate 41 and the flange washer 45 pressing flush against the top and bottom respectively of the frame portion 44 serve to guide and steady the yoke frame carrying the tools, in its movement, it being of course understood that the frame portion 44 is made with smooth parallel plane sides through the extent of lever throw for this purpose. Pins 46 are passed through the ears 38 and lever end at some little distance from said bolt so as to afford rigidity and prevent any angular movement of the yoke frame relative to the lever.

The punch and set mechanisms which are slidably fitted in the sleeve heads 24 are each composed of a tubular set 47 formed at its inner or operative end with an annular concavity 48 adapted to operate against the flange end of the eyelet. Within this tubular set is slidably fitted the punch element consisting of a hollow punch 49, the punch and set having interengaging shoulders 50 adapted to limit the outward projection of the operative punch end 51. The punch end 51 is thus permitted to project far enough to permit an eyelet to be caught thereby from a race-way and threaded thereon with the punch extremity extending some little beyond the eyelet as the eyelet flange rests against the end 48 of the set. The punch and set are of a length so that they are both adapted to engage the backing block 13 in the operating lever when in the lateral position shown in Fig. 5 and to receive operative movements as presently described by the actuation of said lever. Means is provided whereby the punch and set mechanisms are held yieldingly against the backing blocks 13, 14 and for this purpose I show coil springs 52 fixed at one end to the sleeve heads 24 and at their other ends to a cross pin 53 carried by the set. A mating punch element comprising an anvil or a backing member against which the punch and set mechanisms from the opposite sides operate is shown at 54 as a block carried by a bracket strip 55 adjustably secured as seen at 56 to the yoke frame 25. The block 54 is similarly formed at its opposite sides facing the respective punch and set mechanisms with a central punch block portion 57 which is shown as substantially flat and surrounded by an annular concavity 58 of a form and dimension adapted to engage the shanks of the eyelets as they are pressed thereagainst by the set to turn them out and clench them against the material. It is thus to be observed that both the punch blocks against which the punches operate, and the clenching surfaces 58 against which the sets operate, partake of the lateral feed or spacing movement of the punch and set mechanisms and are always in operative alinement therewith; this is an important feature of the combination whereby it is possible to feed the material and clench the eyelets at the same time as will be presently made more clear. Edge guides for the material are also preferably carried by the swinging yoke frame 25. These are shown as rolls 59 journaled to bracket pieces 60 adjustably secured as seen at 61 to the yoke frame, there being preferably guard pieces 62 fixed to the brackets just back of these rolls. A fixed table or work holding plate is indicated at 63 suitably secured as by bolts passing through an angular extension 64 thereof, to the machine frame. This table or work support is recessed as seen at 65 to permit the operative movements of the punch and set mechanisms including the lateral spacing or feed movement, to be presently further described. A spring presser foot 66 is fixed as seen at 67 to the work support at each side thereof, the outer portions of these presser feet being turned out both endwise and in front as seen at 68 to facilitate the insertion of the work. Thus as the material is inserted by the operator between these presser feet and the work support 63, it is yieldingly held thereby against displacement except as fed forward by the punch and set mechanisms as now to be described for spacing the eyelets.

The face cam 5 which as explained acts on the roll 33 to move the punch and set mechanisms laterally for the feeding or spacing movement, has different sector portions thereof about its circumference of different degrees of elevation so as to impart to the punch and set mechanisms the alternate lateral movements and dwells to be explained and the extent of elevations of these raised portions also varies in a definite manner from the center to the circumference of the cam face, being as shown highest adjacent the periphery and lowest at the center, there being, however, a flat lowermost sector $5^a$ which is of the same elevation all the way from its inner to its outer operative limits so that whatever may the extent of lateral or spacing movement imparted to the punch and set mechanisms according to the adjustment of the roller 33, they will always return to the same initial position when the roller 33 descends on to this low flat portion $5^a$. It will be understood that since the roll 33 operates on the side of the face cam nearest the fulcrum 27, *i. e.*, between the shaft 2 and said fulcrum, the adjustment of said roll toward the higher peripheral part of the cam causes an increase in the length of feed throw not only for this reason but also because the leverage is increased. It may now be understood that at the beginning of a cycle of operation and as two pieces of material to be eyeleted are inserted underneath the presser feet 68 at opposite sides of the stationary work support 63, the punch and set mechanisms are positioned laterally in alinement with the backing blocks 13 and also with the punches in alinement with the discharge end of race-ways 69, 69′. These race-ways are each adapted to deliver a line of eyelets *e* with their flanges extending outward or toward the sets. Each race-way is formed with a laterally delivering discharge end 70 adapted to present the foremost eyelet in alinement with the punch as it descends. A retaining spring 71 is fixed to the race-way and in position to permit the foremost eyelet to be moved out by the punch when it is threaded thereon while retaining the rest of the eyelet line.

Figure 11:
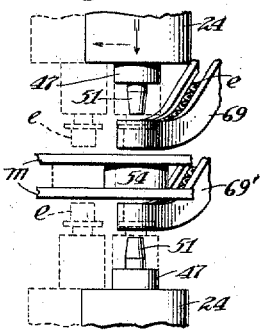
Figure 14:
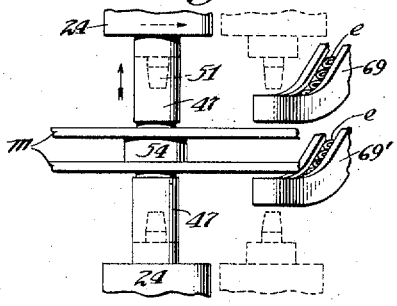

It may now be understood that in operation the punch and set mechanisms are at the beginning of a cycle of operation in the position shown in Fig. 11, *i. e.*, alined with an eyelet *e* in the end of the respective race-ways 69, 69′. Thereupon the initial rise in the peripheral cams 3, 4 moves the punches downward to thread the eyelets thereon. Since the action of the two peripheral cams 3, 4 on the two mechanisms is the same, the operation of the cam 3 will be described in detail for both. Referring to Fig. 7 it will be noted that this initial rise $3^a$ of the cam 3 is active at the same time as the lowermost flat portion $5^a$ of the lateral feed cam 5. This will therefore result in the direct downward movement of the punch to thread the eyelet thereon before any lateral movement takes place. Then the initial rise $5^b$ of the side cam becomes active along with a concentric portion $3^b$ of the peripheral cam. This results in moving the punch with the eyelet threaded thereon laterally to the dotted line position of Fig. 11. Next a further rise $3^c$ of the peripheral cam moves the punch downward to punch the hole in the material *m*, this occurring while a flat portion $5^c$ of the lateral cam leaves the parts stationary as to lateral movement, this operation being indicated in Fig. 12 where the parts move from full line to dotted line position. Thereupon a still further rise $3^d$ of the peripheral cam forces the set forward for clenching the eyelet, and at the same time a further rise $5^d$ of the face cam moves the punch and set laterally for feeding the material one step to space the eyelets; this being indicated by the movement from full line to dotted line position in Fig. 13. During these lateral movements of the punch and set the punch is moved first from the position shown in Fig. 5 to that in alinement with small recess 130 less in cross section than the external diameter of the punch but permitting the punchings to pass thereinto. On the second or major lateral movement for feeding, the punch comes into alinement with the yielding block 19 so that it is permitted to yield backward as the set operates. The block 19 is of a width to afford a yielding backing for the punch throughout this second or major lateral movement for feeding. As shown in Figs. 5 and 6, this block is of a thickness somewhat less than the external diameter of the punch and set mechanism 23, *i. e.*, so that the rim of the hollow set member 47 will find a rigid backing against the block 13 during the lateral feeding movement, while the punch 49 during this feeding movement is alined with the yelding block 19 and being of a diameter not greater than that of said block will be permitted to recede or telescope within the set. The block 19 is of a width substantially corresponding to the extent of this feeding movement and is positioned laterally so as to be in alinement with the punch 49 during the extent thereof. It will be understood that in this lateral feed movement of the punch and set mechanisms, the anvil 54 being carried also by the swinging yoke 25 is kept in alinement therewith. The strip 55 which supports the anvil 54 is preferably of relatively soft pliable material which may be soft copper permitting a self-adaptation and adjustment of the anvil to the punch and set mechanisms which operate against it from opposite sides. Next a descending portion $3^e$ of the peripheral cam permits withdrawal of the punch and set mechanism while a flat portion $5^e$ of the face cam holds the parts against lateral movement, and finally a further descending portion $3^f$ of the peripheral cam completes the withdrawal of the punch and set mechanisms while a descending portion $5^f$ of the face cam permits the return of the punch and set mechanisms laterally to initial position as indicated in Fig. 14, this completing the cycle of operation. It is to be noted that the low flat portion $5^a$ of the face cam is of the same elevation all the way from its periphery to its center, *i. e.*, throughout its operative radial extent and hence irrespective of the adjustment of the roll 33 as described to vary the extent of throw or feed movement, the operated parts *i. e.*, the punch and set mechanisms will always return to the same initial position, thus always being in alinement with the eyelets in the delivery end of the race-ways regardless of the extent of feed movement. It is to be noted that a marked economy of time and operation is effected and a very substantial speeding up of the machine made possible by the present construction whereby the lateral or feed movement may take place at the same time that the clenching operation is being performed. The anti-friction edge guides constituted by the rolls 59 which are preferably concave as shown to best engage and guide the edges of the material, contribute to smoothness and reliability of action. It will be understood that the material is held yieldingly pressed between the presser feet 66 and the work support 63 so that it is not disturbed by the return movement of the punch and set mechanisms, but is fed forward only by the engagement of the punch therethrough and the clenching engagement of the set therewith. It will be understood that the described mechanism illustratively shown as embodied in the special form of face cam 5 and peripheral cams 3, 4, is adapted for performing any automatic work where material or articles are to be fed step by step, with an intermittent actuation of an operating tool or tools in timed relation to such feed for producing any sort of manufacturing result and I therefore desire this feature of the invention to be considered in this broader aspect, as well as in its more specific form herein shown where the operating tools are returned to the same initial position after feeding regardless of the length of the feed stroke, and regardless also of any particular tools that may be used for performing either the operation of the present case or any other operation. It is to be noted that a characterizing feature of this mechanism is that the means for producing the operating movements, *i. e.*, the peripheral cams 3, 4 and the face cam 5 are operated in synchronism and timed to wait on the movements of each other for producing the feeding and operating strokes in proper sequence. I consider the construction whereby the punch is operated initially to take the eyelet out of a stationary race-way, to be valuable and important, since thereby the additional mechanism heretofore necessary for moving the race-ways is entirely dispensed with. I also consider the feature of construction whereby the edge guide members 59, are supported from the yoke frame 25, and entirely independent of the anvil 54 or its immediate support, to be valuable and important since this leaves the anvil free for the self-adaptation and adjustment relative to the punch and set mechanisms as described and also provides a more convenient mounting for the edge guides.

I am aware that individual features of the invention may be embodied in other relations without departing therefrom and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. An eyeleting machine, comprising mechanism for punching holes in material, and inserting and clenching eyelets in said holes, and means for feeding the material to space the eyelets connected and arranged to operate while the clenching of the eyelets is being performed.

2. An eyeleting machine, comprising mechanism for punching holes in material, inserting eyelets in said holes, and clenching said eyelets, combined with means for feeding the material while the eyelet is being clenched, said means consisting in a mounting for the clenching instrumentality connected and arranged to move it laterally as the clenching takes place.

3. An eyeleting machine, comprising a telescopically combined punch and set mechanism having means to impart punching and setting movements thereto, an anvil mounted to coöperate therewith, and means for moving said punch and set mechanism laterally while the set is being advanced for clenching.

4. An eyeleting machine, comprising a punch and set telescopically combined, means for imparting punching and setting movements to the punch and set respectively, and means for intermittently moving the punch and set laterally to feed the material and space the eyelets, said means being connected and arranged to operate during that part of the cycle of operation in which the set is moved forward to clench the eyelet.

5. An eyeleting machine, comprising a punch, a race-way adapted to present an eyelet in alinement with said punch at an initial position thereof, means for moving said punch forward to thread an eyelet thereon, then laterally to remove the eyelet from the race-way, and then farther forward to punch a hole in the material and position the eyelet relative thereto, a backing against which said punch is adapted to operate, means for clenching the eyelet so positioned, and means for imparting a further lateral movement to the punch to feed the material and space the eyelets.

6. An eyeleting machine, comprising an eyelet race-way having a stationary delivering end adapted to deliver eyelets yieldingly therefrom, a punch mounted to aline with the foremost eyelet in said race-way in its initial position, means for moving said punch forward to engage the eyelet, then laterally to remove the eyelet, and then farther forward to punch a hole in material and position the eyelet relative thereto, an anvil backing coöperative with said punch, means for clenching the eyelet so positioned, and means for moving said punch and clenching means laterally to feed the material and space the eyelets.

7. An eyeleting machine, comprising a punch and set telescopically combined, means for imparting operative movements thereto, an anvil backing coöperative therewith, and an eyelet race-way having a stationary delivery end, said means for imparting operative movements to the punch being arranged to first move the punch forward to thread an eyelet in said race-way thereon, then move the punch laterally to remove the eyelet, then position the eyelet on the material, and then move the punch again laterally to feed the material and space the eyelets.

8. An eyeleting machine, comprising an operatively combined punch and set, means for imparting operative movements thereto, and an anvil backing having a pliable mounting adapted to permit self adaptation and adjustment of the anvil relative to the punch and set in the operation thereof, and means to support said anvil backing against the operative movements of the punch and set mechanism.

9. An eyeleting machine, comprising a pair of telescopically combined punch and set mechanisms oppositely mounted and facing each other, mechanism for imparting operative movements thereto, and an anvil backing interposed between said punch and set mechanisms having a pliable mounting adapted to permit self adaptation and adjustment relative to the punch and set mechanisms in the operation thereof.

10. An eyeleting machine, comprising a punch and a set coöperatively mounted to operate on a material, mechanism for imparting operative movements thereto, means presenting a backing for the operation of said punch and set having a pliable mounting adapted to permit self-adjustment of said backing relative to the punch and set, and an edge guide for the material mounted adjacent to, but clear of, and having its support relatively remote from said backing means.

11. An eyeleting machine, comprising a punch and a set mounted in coöperative relation for acting on a material, mechanism for imparting operative movements thereto, an anvil backing for said punch and set adjustable in the direction of movement thereof, and an edge guide for the material mounted adjacent said anvil but clear thereof and with its support relatively remote therefrom whereby the anvil may be adjusted without interfering with said guide.

12. An eyeleting machine, comprising a punch and a set coöperatively arranged for acting on a material, mechanism for imparting operative movements thereto, an anvil backing presenting a punch block and a clenching surface coöperative with the punch and set respectively having a pliable mounting adapted to permit self-adjustment of said backing relative to the punch and set, and an anti-friction edge guide for the material formed as a roll mounted adjacent to said anvil, but clear thereof and with its support relatively remote therefrom.

13. An eyeleting machine, comprising a pair of telescopical combined punch and set mechanisms oppositely mounted with an interposed anvil backing, means for imparting operative movements to said mechanisms, a yoke frame in which said mechanisms are slidably fitted, and means consisting in a face cam connected to move in synchronism with the operation of the punch and set mechanisms for moving said yoke frame intermittently to impart lateral feeding movements of said punch and set mechanisms.

14. A machine of the kind described, comprising a tool for performing a manufacturing result on a material with means for operating the same, and means for feeding the material consisting in a cam connected to move in timed relation to said tool operating means and an element coöperative therewith for effecting said feed movement, said cam presenting a plurality of operative paths adapted to produce different operating strokes for feeding and having a neutral portion common to all of said paths whereby said feeding element is returned to the same point when actuated by any one of the paths of said cam, and said element engageable therewith being adjustable to engage any one of said operative paths at will.

15. A machine of the kind described, comprising tool mechanism adapted to perform a manufacturing result on a material, means for operating said mechanism, and means for effecting a relative feed between the material and said tool mechanism, said means consisting in a cam connected to move in timed relation with said tool operating mechanism, said cam presenting a plurality of operative paths each adapted to produce a different feeding result and having a neutral portion common to all of said paths whereby said feeding element is returned to the same point when actuated by any one of the paths of said cam, and an element connected to effect said feed movement and adjustable to engage any one of said paths at will.

16. A machine of the kind described, comprising tool mechanism for producing a manufacturing result on a material, means for operating said mechanism, and means for effecting a relative feed between said tool mechanism and the material, said means consisting in a cam connected to move in timed relation with said tool operating mechanism, said cam presenting a series of operating paths adapted to produce different feeding strokes, and a member adjustable to engage any one of said paths at will and connected to effect said feed, said cam being formed to return the parts operated by said element engageable therewith to the same initial position regardless of the operating path engaged thereby.

17. In a fastener setting machine, a telescopic punch and set, and a hammer for operating the same, said hammer having independently adjustable elements acting respectively to operate the punch and set.

18. A hammer for use in a fastener setting machine employing a punch and set, said hammer comprising a lever-arm bifurcated at its extremity to provide opposed, spaced arms, a vertically adjustable punch operating element, and a vertically adjustable set operating element located between said arms.

19. In a fastener setting machine, a telescopic punch element and set, a punch operating hammer, and an adjustable element carried by said hammer and adapted to contact with said punch.

20. In a fastener setting mechanism, a telescopic punch element and set, a set operating hammer, and an adjustable element carried by said hammer and adapted to contact with said set.

21. In a fastener setting machine, a telescopic punch and set, and a hammer for operating the same, said hammer having independently adjustable elements acting respectively, to operate the punch and set, said elements having screw adjusting means and devices for locking the same in adjusted position.

22. A hammer for use in a fastener setting machine employing a punch and set, said hammer comprising a lever arm bifurcated at its extremity to provide opposed, spaced arms, a vertically adjustable punch operating element and a vertically adjustable set operating element located between said arms.

In testimony whereof, I have signed my name to this specification.

FRANK L. HARMON.